(12) United States Patent
Pasquero et al.

(10) Patent No.: US 8,766,937 B2
(45) Date of Patent: Jul. 1, 2014

(54) METHOD OF FACILITATING INPUT AT AN ELECTRONIC DEVICE

(75) Inventors: Jerome Pasquero, Kitchener (CA); Noel John Orland Stonehouse, Waterloo (CA); Daniel James Legg, Kitchener (CA); Eric Philip Loney, Smith Falls (CA)

(73) Assignee: BlackBerry Limited, Waterloo (CA)

( * ) Notice: Subject to any disclaimer, the term of this patent is extended or adjusted under 35 U.S.C. 154(b) by 327 days.

(21) Appl. No.: 13/228,252

(22) Filed: Sep. 8, 2011

(65) Prior Publication Data

US 2013/0063361 A1 Mar. 14, 2013

(51) Int. Cl.
G06F 3/041 (2006.01)

(52) U.S. Cl.
USPC ............ 345/173; 345/168; 345/169; 715/259

(58) Field of Classification Search
USPC ......... 345/173–179; 381/181–231; 704/1–10; 715/259–260
See application file for complete search history.

(56) References Cited

U.S. PATENT DOCUMENTS

| 2004/0104896 | A1 | 6/2004 | Suraqui | |
|---|---|---|---|---|
| 2004/0140956 | A1 | 7/2004 | Kushler et al. | |
| 2006/0028450 | A1* | 2/2006 | Suraqui | 345/169 |
| 2006/0082555 | A1* | 4/2006 | Kang et al. | 345/169 |
| 2006/0176283 | A1* | 8/2006 | Suraqui | 345/169 |
| 2007/0040813 | A1 | 2/2007 | Kushler et al. | |
| 2010/0107067 | A1* | 4/2010 | Vaisanen | 715/702 |
| 2010/0241984 | A1 | 9/2010 | Nurmi et al. | |
| 2010/0289752 | A1* | 11/2010 | Birkler | 345/173 |
| 2011/0082686 | A1 | 4/2011 | Suraqui | |
| 2011/0115730 | A1* | 5/2011 | Kim et al. | 345/173 |
| 2012/0262488 | A1* | 10/2012 | Liu et al. | 345/649 |

FOREIGN PATENT DOCUMENTS

| DE | 10357475 | 7/2005 |
|---|---|---|
| EP | 2073114 | 6/2009 |
| WO | 2010109294 | 9/2010 |
| WO | 2011008861 | 1/2011 |

OTHER PUBLICATIONS

Examiner's Report dated Apr. 10, 2013, issued from the corresponding Canadian patent application No. 2,793,436.
PCT Application No. PCT/CA2011/001009, International Search Report, dated Apr. 18, 2012.
European Patent Application No. 11180585.9, European Search Report dated May 3, 2012.
Office Action dated Feb. 8, 2013, issued from the corresponding European patent application No. 11180585.9.

* cited by examiner

*Primary Examiner* — Alexander Eisen
*Assistant Examiner* — Sanjiv D Patel
(74) *Attorney, Agent, or Firm* — Lesley M. Morrison; Borden Ladner Gervais LLP

(57) ABSTRACT

A method of facilitating input at an electronic device includes detecting a first touch at a first touch location on a touch-sensitive device; the first touch being associated with a first character; detecting a second touch at a second touch location on the touch-sensitive surface, the second touch being associated with a second character; when movement of one of the first touch and the second touch is detected, determining a distance between the first touch location and the second touch location, the distance being associated with a number of characters of an object; identifying candidate objects in reference data that match the number of characters and include an initial character that matches the first character and a final character that matches the second character; and displaying at least one candidate object.

12 Claims, 10 Drawing Sheets

US 8,766,937 B2

METHOD OF FACILITATING INPUT AT AN ELECTRONIC DEVICE

FIELD OF TECHNOLOGY

The present disclosure relates to portable electronic capable of receiving touch input and the control of such portable electronic devices.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed.

Improvements in electronic devices with touch-sensitive displays are desirable.

BRIEF DESCRIPTION OF THE DRAWINGS

Embodiments of the present disclosure will now be described, by way of example only, with reference to the attached figures, wherein.

DETAILED DESCRIPTION

Figure 1:
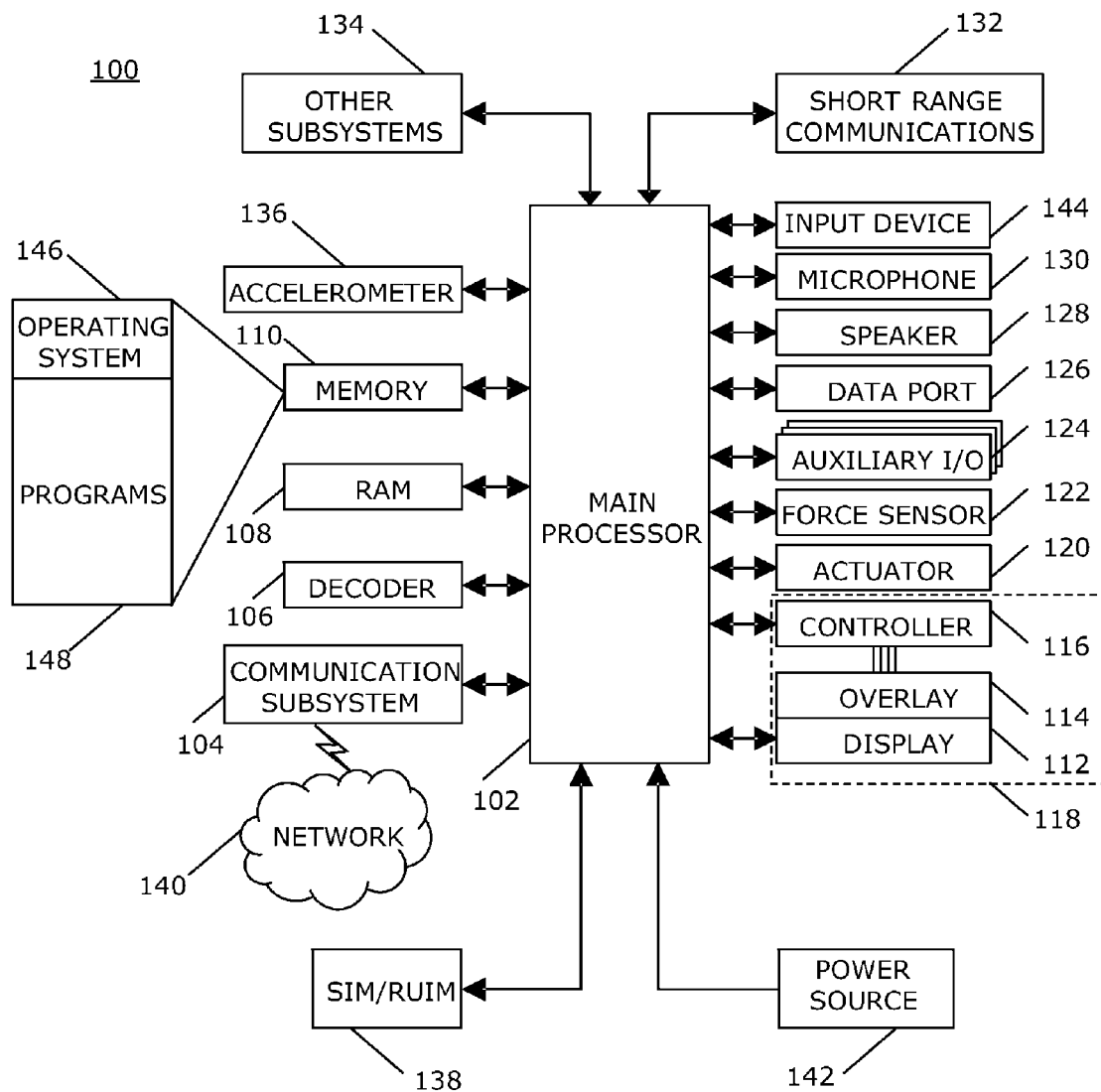
FIG. 1 is a simplified block diagram of one example of a portable electronic device in accordance with the present disclosure.

The following describes an apparatus for and method of facilitating input at an electronic device, the method including: detecting a first touch at a first touch location on a touch-sensitive device; the first touch being associated with a first character; detecting a second touch at a second touch location on the touch-sensitive surface, the second touch being associated with a second character; when movement of one of the first touch and the second touch is detected, determining a distance between the first touch location and the second touch location, the distance being associated with a number of characters of an object; identifying candidate objects in reference data that match the number of characters and include an initial character that matches the first character and a final character that matches the second character; and displaying at least one candidate object.

In another aspect there is provided an electronic device including: a housing; a display exposed by the housing; and functional components in the housing comprising a memory and a processor operably connected to the display for executing a program stored in the memory to cause the electronic device to detect a first touch at a first touch location on a touch-sensitive surface; the first touch being associated with a first character, detect a second touch at a second touch location on the touch-sensitive surface, the second touch being associated with a second character, determine a distance between the first touch location and the second touch location when movement of the first touch is detected, the distance being associated with a number of characters of an object, identify candidate objects in reference data that match the number of characters, include an initial character that matches the first character and a final character that matches the second character, and display at least one candidate object.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, tablets, global positioning system devices, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 140. The wireless network 140 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, an auxiliary input/output (I/O) subsystem 124, a data port 126, an input device 144, a speaker 128, a microphone 130, short-range communications 132, and other device subsystems 134. The processor 102 further interacts with a display 112 having a touch-sensitive overlay 114 operably connected to an electronic controller 116 that together comprise a touch-sensitive display 118. The portable electronic device 100 may alternatively interact with a display that is not touch-sensitive, such as a liquid crystal display (LCD), for example. When the portable electronic device includes an LCD, a touch-sensitive device may be provided on the portable electronic device 100 to interact with the processor 102. The touch-sensitive device may function in a similar manner as the touch-sensitive display to detect user input.

The processor 102 may optionally interact with one or more actuators 120 to provide tactile feedback and one or more force sensors 122 to detect a force imparted on the touch-sensitive display 118. Interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 140. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 140, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 140 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display may include a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The touch-sensitive display 118 is also configured to detect a gesture. A gesture, such as a swipe, is a type of touch, that begins at an origin point and continues to a finishing point while touch contact is maintained. A swipe may be long or short in distance, or duration, or both distance and duration. Two points of the swipe may be utilized to determine a vector that describes a direction of the swipe. The direction may be referenced with respect to the touch-sensitive display 118, the orientation of the information displayed on the touch-sensitive display 118, or another reference. For the purposes of providing a reference, "horizontal" as utilized herein is substantially left-to-right or right-to-left relative to the orientation of the displayed information, and "vertical" as utilized herein is substantially upward or downward relative to the orientation of the displayed information. The origin point and the finishing point of the swipe may be utilized to determine the magnitude or distance of the swipe. The duration of the swipe may be determined from the origin point and finishing point of the swipe in time. The processor 102 receives data from the controller 116 to determine the direction, magnitude, and duration of the swipe. The gesture may be tracked and a plurality of sub-vectors determined for each gesture. The final sub-vector may be utilized to determine a distance and duration of a final portion of the gesture. The processor 102 receives data from the controller 116 to determine the speed of the swipe based on the distance and duration of the final portion of the gesture.

Figure 2:
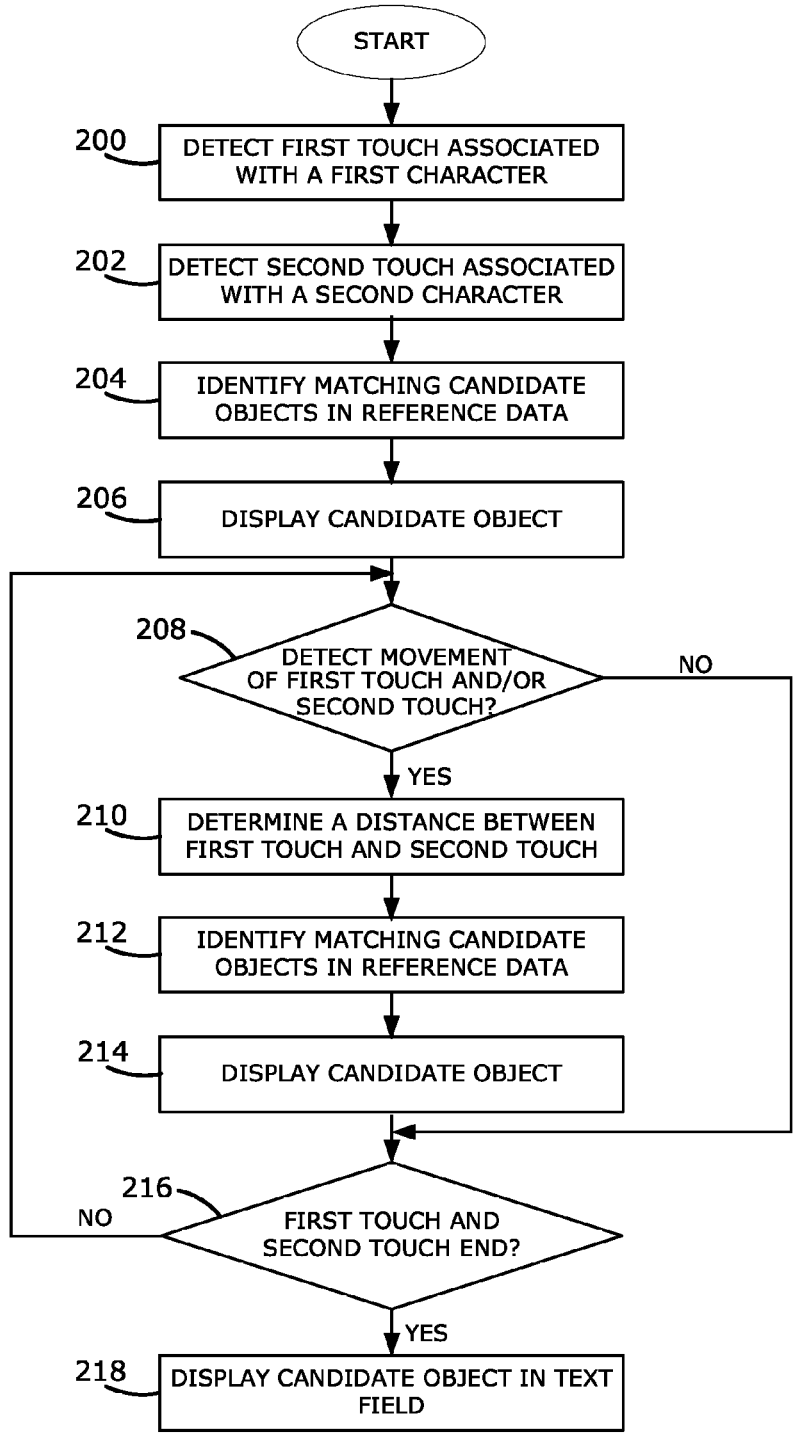
FIG. 2 is a flowchart illustrating an example of a method of facilitating input at an electronic device in accordance with the present disclosure.

FIG. 2 is a flowchart illustrating an example of a method of facilitating input at an electronic device. The method may be carried out by software executed by, for example, the processor 102. Coding of software for carrying out such a method is within the scope of a person of ordinary skill in the art given the present description. The method may contain additional or fewer processes than shown and described, and may be performed in a different order. Computer-readable code executable by, for example, the processor 102 of the portable electronic device 100 to perform the method, may be stored in a computer-readable medium, such as a non-transitory computer-readable medium.

According to the method of FIG. 2, a first touch and a second touch are detected 200, 202 on a touch-sensitive device, such as the touch-sensitive display 118. The first touch is associated with a first character of a keyboard and the second touch is associated with a second character of a keyboard. The keyboard may be any arrangement of selectable characters, such as a physical keyboard or a virtual keyboard, for example. In addition, the keyboard may include English language characters or characters associated with another language, for example.

Following detection of the first touch and the second touch, matching candidate objects in reference data having an initial character that matches the first character and a final character that matches the second character are identified 204. The reference data is searchable and may be provided as part of a predictive text application. The reference data may include different types of linguistic objects such as dictionary entries, contact data records stored in a contacts database and acronyms, for example. The predictive text application may modify the reference data to add objects when an object, such as a word or set of characters, that is not already included, is entered by the user.

A most probable candidate object may be determined by ordering the matching candidate objects based on a criteria, such as frequency of user entry, previous entered word(s), alphabetical position, or context, such as active application, for example. The criteria selected may be determined based on the predictive text application. Ordering of the matching candidate objects may be performed as the matching candidate objects in reference data are identified 204 or following identification 204 of all of the matching candidate objects.

Referring still to FIG. 2, the most probable candidate object is then displayed 206. When no movement of one or both of the first touch and the second touch is detected 208 and both the first touch and second touch have ended 216, the most probable candidate object is displayed in a text field 218.

When movement of one or both of the first touch and the second touch is detected 208, a distance between the first touch and the second touch is determined 210. The distance between the first touch and the second touch is associated with a number of characters of an object. Matching candidate objects are then identified 212 in reference data. The reference data is searchable to identify candidate objects having the number of characters associated with the distance between the first touch and the second touch and including an initial character that matches the first character and a final character that matches the second character. The most probable candidate object is then determined by ordering the matching candidate objects based on a criteria. From the matching candidate objects, a most probable candidate object is displayed 214.

When further movement of one or both of the first touch and the second touch occurs 208, an updated distance between the first touch and the second touch is determined 210 and matching candidate objects are then identified 212 in reference data. The updated distance may be a horizontal distance between the first touch and the second touch corresponding to the direction of typed text on the touch-sensitive display 118 or an absolute distance between the first touch and the second touch. The updated distance may be associated with a different number of characters of an object than the previously determined distance. The most probable candidate object of the matching candidate objects is then displayed 214. Further movement of one or both of the first touch and the second touch may result in display 214 of other most probable candidate objects, which are associated with different numbers of characters. When both the first touch and second touch have ended 216, the most probable candidate object is displayed in a text field 218.

The distance between the first touch and the second touch may be associated with a number of characters of an object by determining a reference distance, which may correspond to the distance that is determined when movement of one or both of the touches is first detected. A number of characters may then be associated with the reference distance based on a ratio of the distance relative to a display width. For example, a distance that is approximately 75% of the display width may be associated with a ten character object and a distance that is approximately 25% of the display width may be associated with a three character object. The updated distances may be compared to the reference distance. Alternatively, the reference distance may be updated following touch movement so that the updated distances are compared to distances determined following the previous touch movement. For example, the user may increase the distance between his or her thumbs in order to display a list of objects having more characters than a currently displayed list or the user may decrease the distance in order to display a list of objects having fewer characters than the currently displayed list. When no matching candidate objects for a particular object length are identified, matching candidate objects for the next object length may be displayed without additional movement of one or both touches. The user may continue to move one or both thumbs until the desired number of characters has been achieved.

The flowchart of FIG. 2 is simplified for the purpose of explanation. Additional or fewer steps may be carried out. For example, the most probable candidate object may be provided as part of a list of ordered candidate objects. In addition, identification 204 of matching candidate objects in reference data and display 206 of a most probable candidate object may not occur prior to movement of the first and/or second touch being detected 208.

Figure 3:
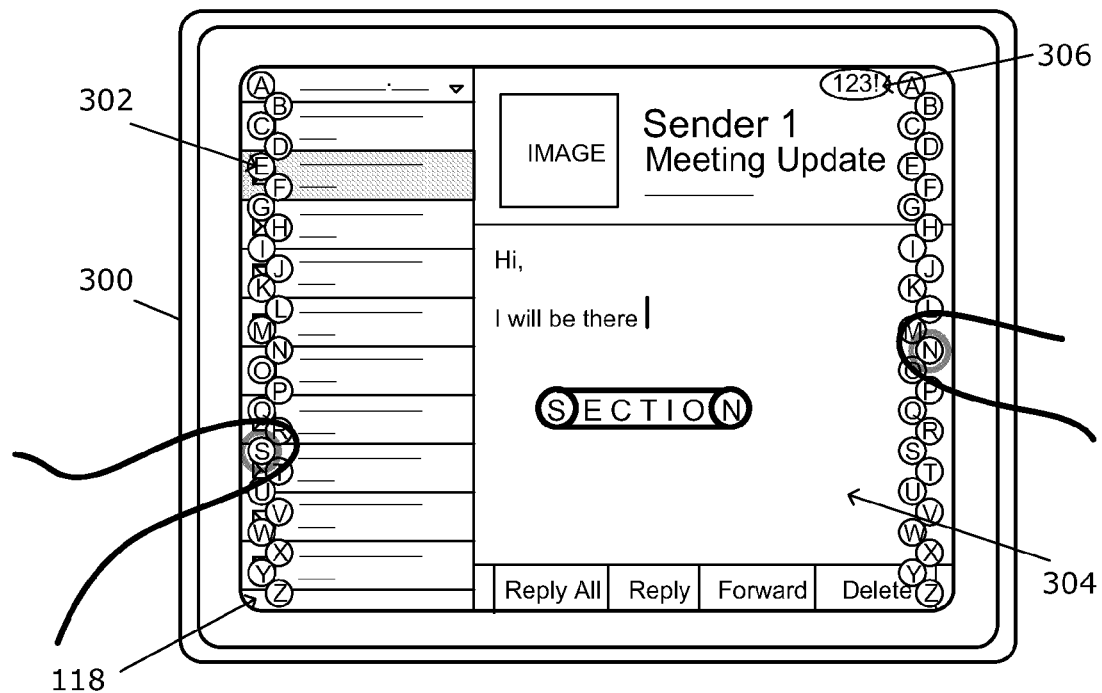
FIGS. 3 to 7 illustrate an example of a portable electronic device receiving touches in accordance with the present disclosure.

A front view of an example of a portable electronic device 100 is shown in FIG. 3. The portable electronic device 100 includes a housing 300 that houses the internal components that are shown in FIG. 1 and frames the touch-sensitive display 118 such that an outer surface of the touch-sensitive display 118 is exposed for user-interaction when the portable electronic device 100 is in use. In the example shown in FIG. 3, the touch-sensitive display 118 includes a virtual keyboard 302 including left and right portions for user input of data in the form of, for example, characters during operation of the portable electronic device 100. Data may also be entered in the form of numbers or symbols, which may be accessed by selecting a toggle key 306 from the virtual keyboard 302. Alternatively, the virtual keyboard 302 may include top and/or bottom portions for facilitating entry of numbers and symbols, for example.

An area on the touch-sensitive overlay 114 that is associated with a key of the virtual keyboard 302 such that a touch anywhere on that area results in selection of a character, matches the area of the corresponding rendered representation on the touch-sensitive display 118. The area may be larger or smaller than the rendered representation on the touch-sensitive display 118.

Continued reference is made to FIG. 2, with additional reference to FIGS. 3 to 7 to describe an example of a method of facilitating input at the portable electronic device 100. In the present example, the keyboard 302 is rendered on the touch-sensitive display 118 for user entry of data in fields of an application, such as an email application.

For the purpose of the present explanation, the user has already entered characters in a text field during composition of an email. In this example, the text field is a body 304 of an e-mail. As shown, the user touches the touch-sensitive display 118 at a location corresponding to the character "s" with a left thumb and at a location corresponding to the character "n" with a right thumb. Matching candidate objects having an initial character that matches "s" and a final character that matches "n" are identified 204 in reference data and "section", which is determined to be the most probable candidate object, is displayed 206.

Figure 4:
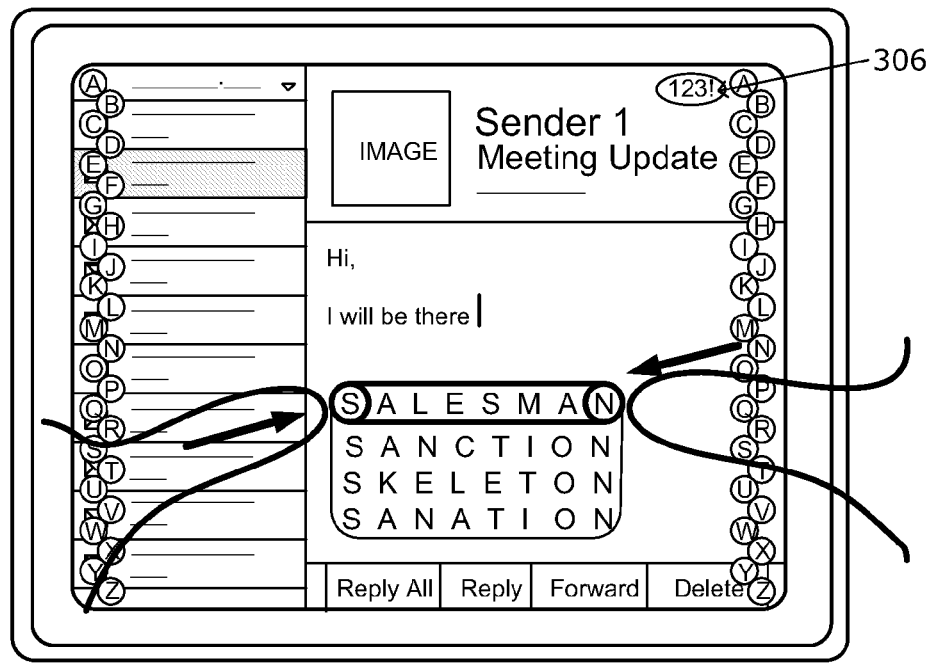

When "section" is not the object to be entered, the user moves both touch locations toward one another to approximate a length of the word that the user wishes to enter, as shown in FIG. 4. Following detection 208 of the touch movement, a distance between the first touch and the second touch is determined 210. The distance is associated with eight characters and candidate objects having eight characters, an initial character "s" and a final character "n" are then identified 212 in reference data. An ordered list of matching candidate objects is then displayed 214: "sanction", "skeleton" and "sanction", with the most probable candidate object, "salesman", highlighted at the top of the list.

Figure 5:
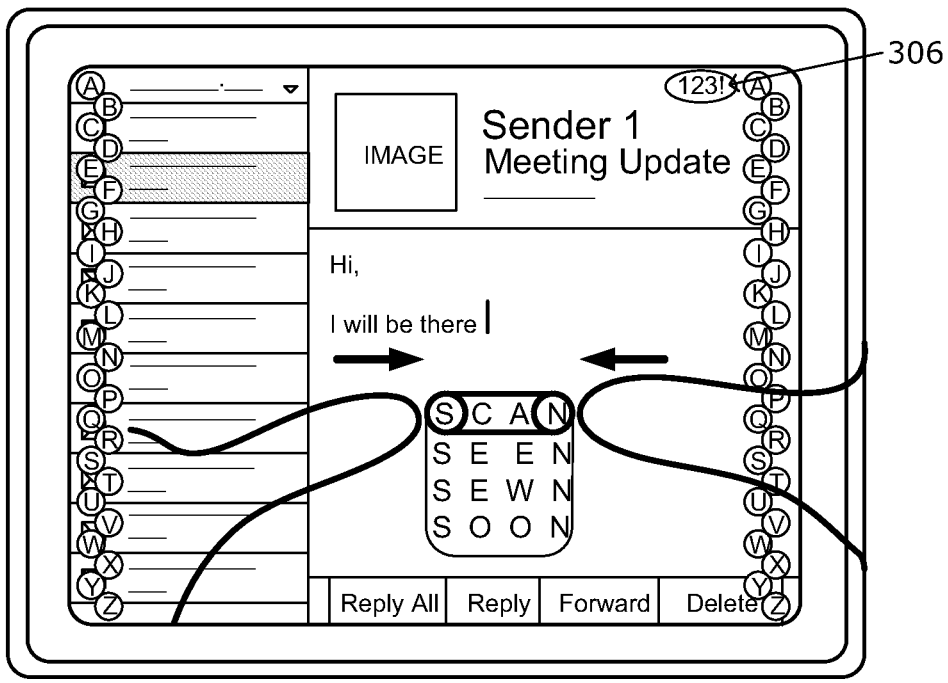

When the object that the user wishes to enter is not an eight character object, the user moves both touch locations to approximate a different object length. In the present example, the user moves his or her thumbs toward one another in order to approximate an object having fewer characters. Following detection 208 of the touch movement, an updated distance between the first touch and the second touch is determined 210. As shown in FIG. 5, the updated distance is associated with four characters. Candidate objects having four characters, an initial character "s" and a final character "n" are identified 212 in reference data and an ordered list of matching candidate objects is then displayed 214. The list includes: "scan", which is the most probable candidate object highlighted at the top of the list, "seen", "sewn" and "soon".

When the object that the user wishes to enter is not "scan", which is highlighted, but is a four letter object, the user ends one of the touches. As shown, in FIG. 6, touch contact between the touch-sensitive display 118 and the left thumb is discontinued. The user then moves the right thumb up and/or down on the touch-sensitive display 118 to scroll through the list of ordered candidate objects. Because the list is ordered based on a criteria, such as frequency of use, the user generally does not need to scroll the entire list, which may be extensive.

Figure 7:
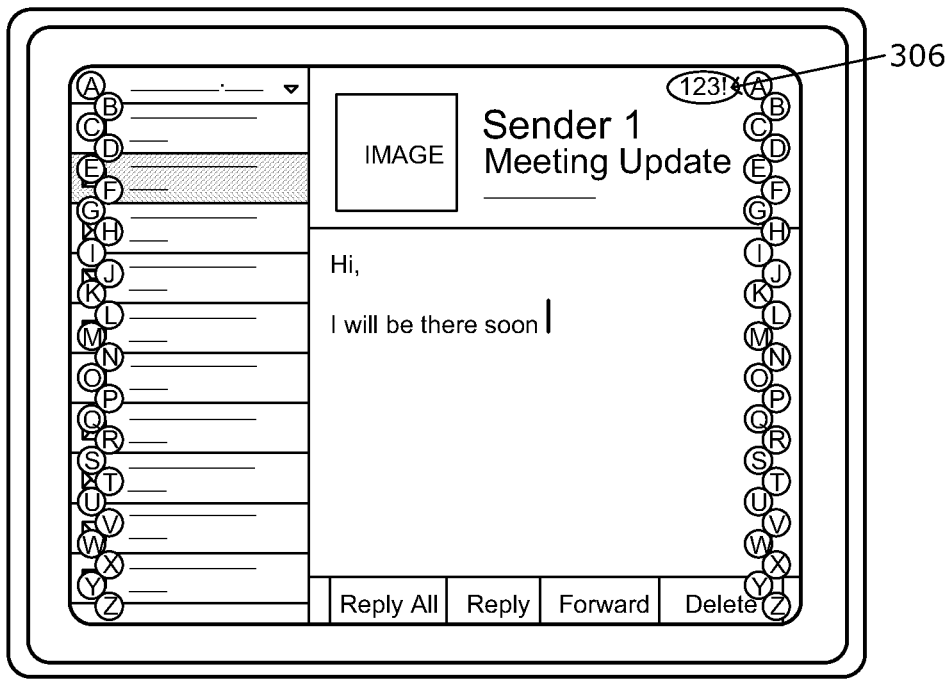

The objects in the list are highlighted in response to movement of the touch location. When the word that the user wishes to select is highlighted, the user breaks touch contact between the touch-sensitive display and the right thumb to end both touches 216. The highlighted word, "soon", is displayed 218 in the text field 304, as shown in FIG. 7.

Figure 6:
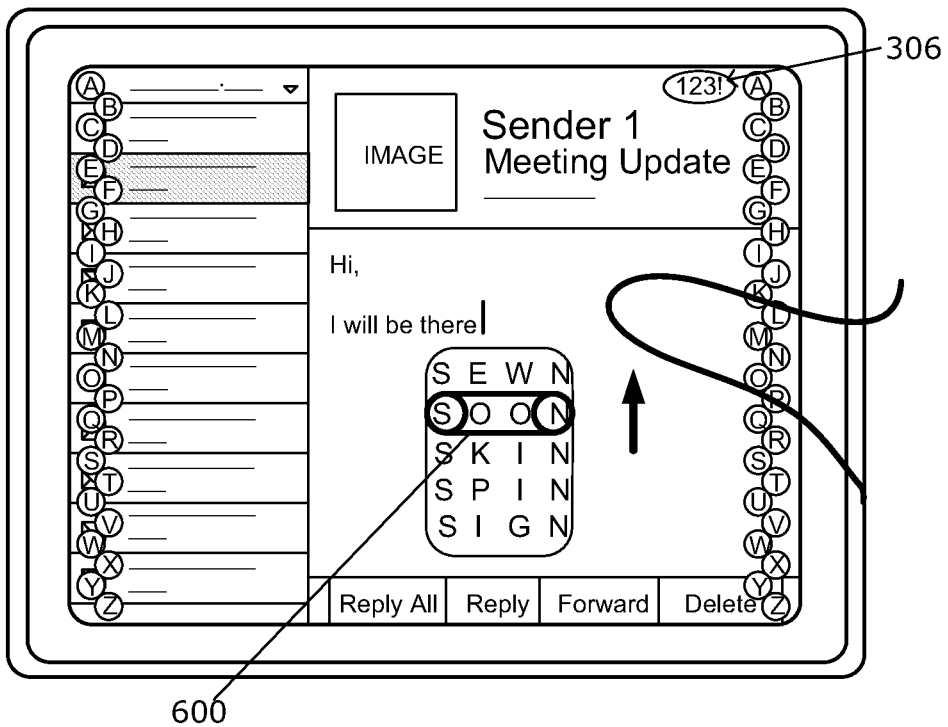

The highlighted candidate object, which is selected when both touches end, is identified by a line 600 extending around the word, as shown in FIG. 6. Outlining is one example of highlighting. Other types of highlighting that visually differentiate the candidate object to be selected from other candidate objects in the list may alternatively be used.

The number of candidate objects of the list that are displayed may be limited by the size of the display and the font size of the characters in the list. When the number of candidate objects in the list exceeds the number of candidate objects displayed, an arrow or other visual indicator may be provided to the user.

Figure 8:
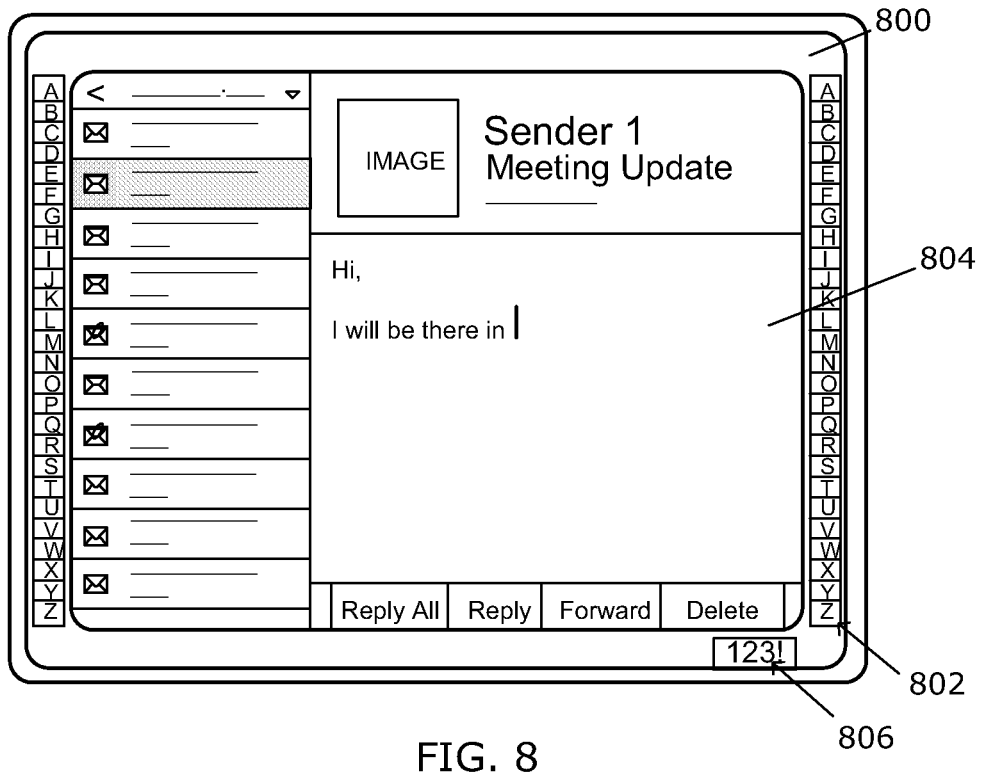
FIGS. 8 to 12 illustrate another example of a portable electronic device receiving touches in accordance with the present disclosure.

Referring to FIG. 8, in another example, the touch-sensitive overlay 114 of a portable electronic device 100 is capable of detecting meta-navigation gestures. A meta-navigation gesture is a touch that has an origin point that is on a non-display area 800 that is outside the display area of the touch-sensitive overlay 114. Meta-navigation gestures may have an end point that is generally at the same location as the origin point, an end point that is outside the display area of the touch-sensitive overlay 114 or an end point that is on the display area of the touch-sensitive display. The use of meta-navigation gestures provides additional input that may be distinguished from non-meta navigation gestures or other touches. These meta-navigation gestures may facilitate entry of input related to an application for which information is not displayed at the time the gesture is received and may further provide system level navigation without the use of additional screens or menus for such navigation, providing an improved interface. In the present example, meta-navigation gestures facilitate character entry by providing a keyboard 802 including a toggle key 806 in the non-display area 800. The keyboard 802 includes right and left portions to facilitate two-handed character entry. Because the keyboard 802 is provided in the non-display area 800, the display area of the touch-sensitive display is unobscured by the keyboard in this example.

An area on the touch-sensitive overlay 114 that is associated with a key of the keyboard 802 such that a touch anywhere on that area results in selection of a character, matches the area of the corresponding representation on the non-display area 800. The area may be larger or smaller than the representation on the non-display area 800.

Referring also to FIG. 2, with additional reference to FIGS. 8 to 12 another example of a method of facilitating input at the portable electronic device 100 will now be described. In the present example, the keyboard 802 is for user entry of data in fields of an application, such as an email application.

Figure 9:
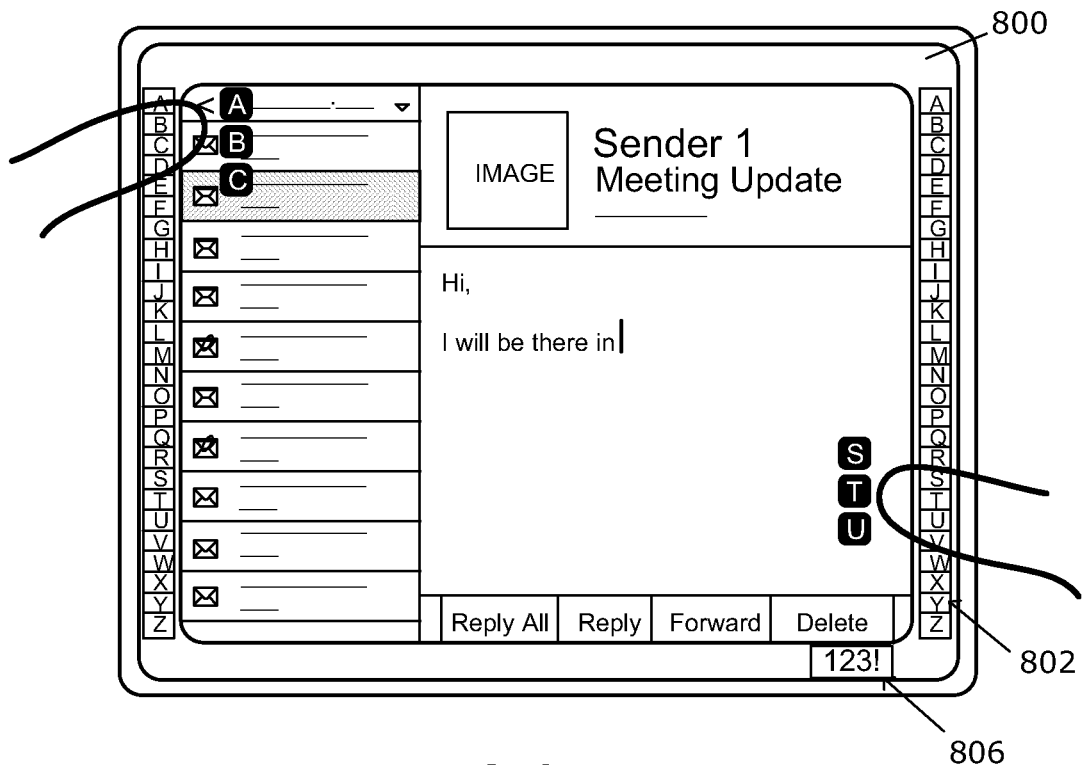
Figure 10:
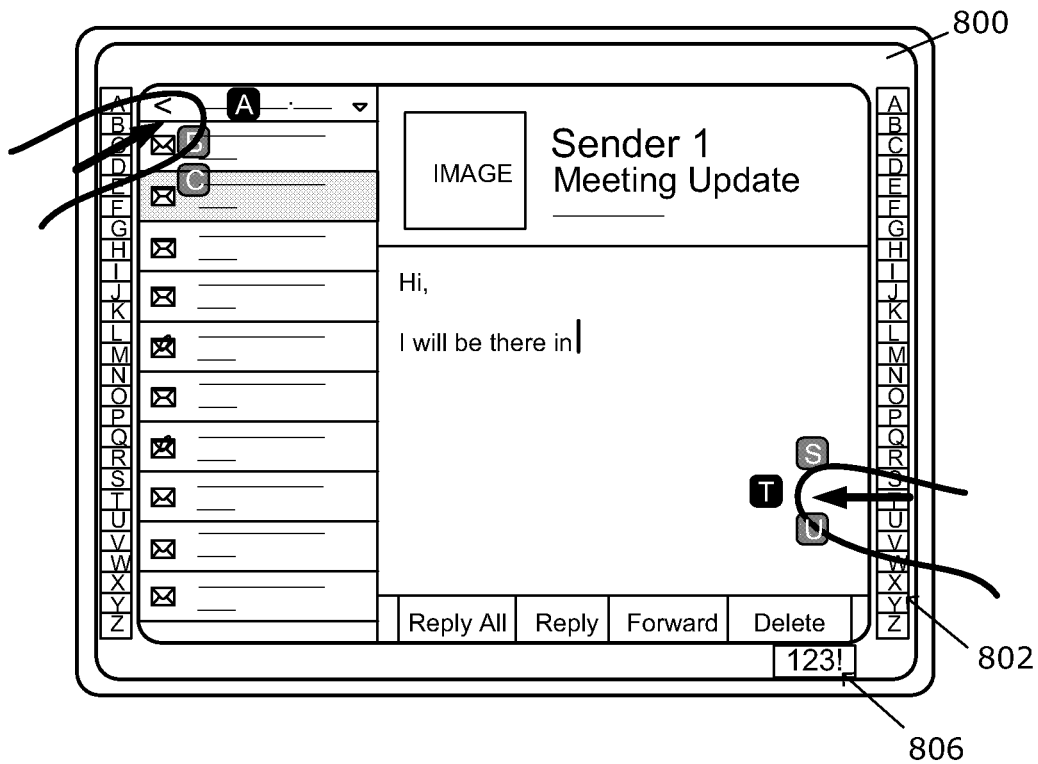

For the purpose of the present explanation, the user has already entered characters in a body 804 of an e-mail. Referring to FIG. 9, the user touches the non-display area 800 at a location corresponding to the character "a" with a left thumb and at a location corresponding to the character "t" with a right thumb. As shown in FIG. 9 and FIG. 10, the left thumb touch includes a touchdown at a location near the character "a" in the non-display area 800 and movement of the touch onto the touch-sensitive display 118 to display enlarged characters "a", "b" and "c". Further movement of the touch to the location of the enlarged character "a" associates the touch with the character "a". Similarly, the right thumb touch includes a touchdown at a location near the character "t" in the non-display area 800 and movement of the touch onto the touch-sensitive display 118 to display enlarged characters "s", "t" and "u". Further movement of the touch to the location of the enlarged character "t" associates the touch with the character "t". Movement of the touches for the purpose of associating the touches with characters may be avoided when the keys of the keyboard 800 are large enough to be discretely selectable by the user.

Figure 11:
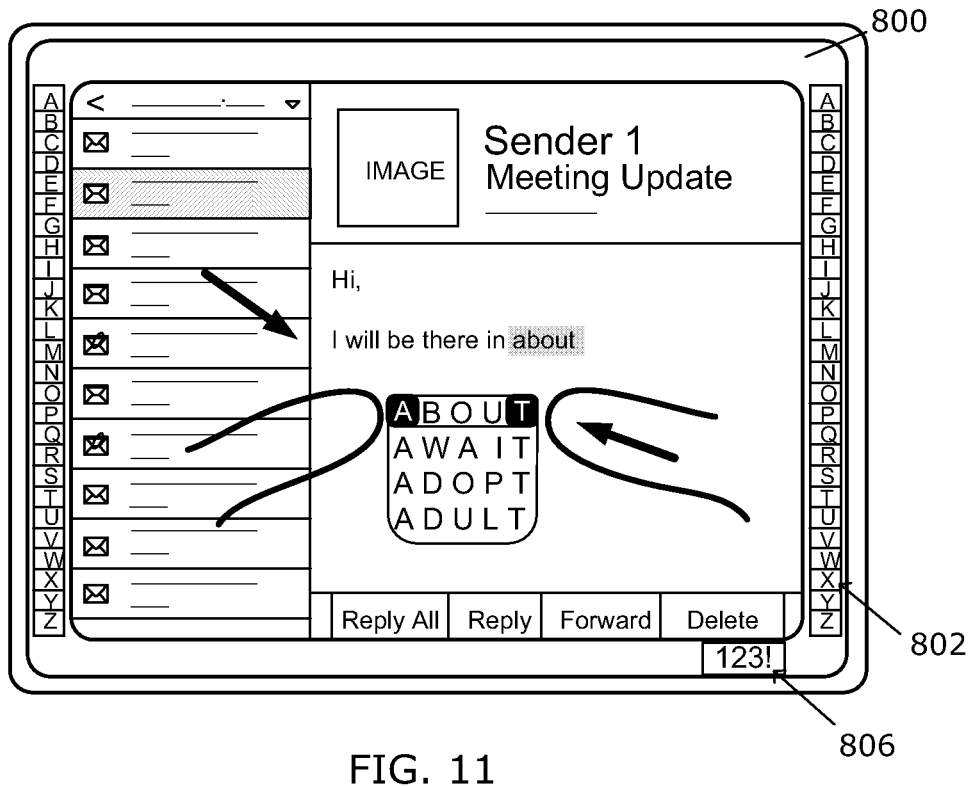
Figure 12:
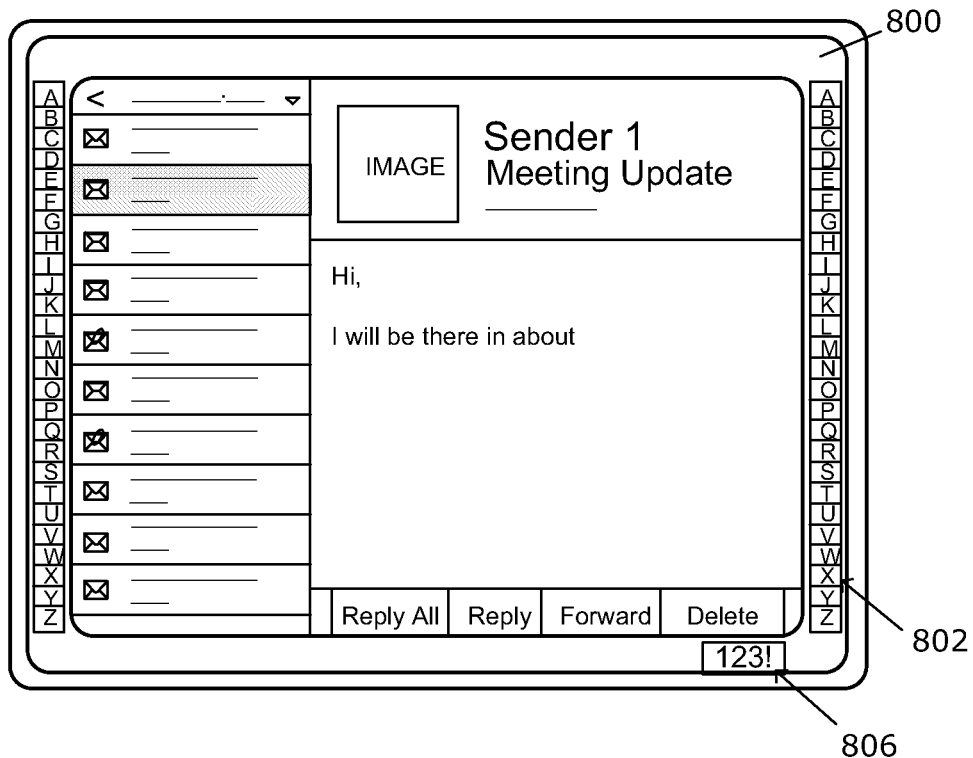

When touches have been detected 200, 202 and associated with the characters "a" and "t", movement of the touches is detected 208. As shown in FIG. 11, the user moves both touch locations toward one another to approximate a length of the word to be entered. A distance between the first touch and the second touch is then determined 210. The distance is associated with five characters and candidate objects having five characters, an initial character "a" and a final character "t" are identified 212 in reference data. An ordered list of matching candidate objects is then displayed 214: "await", "adopt" and "adult", with the most probable candidate object, "about", highlighted at the top of the list. The user lifts both thumbs to end the touches 216 and display 218 "about" in the text field 804, as shown in FIG. 12.

Figure 13:
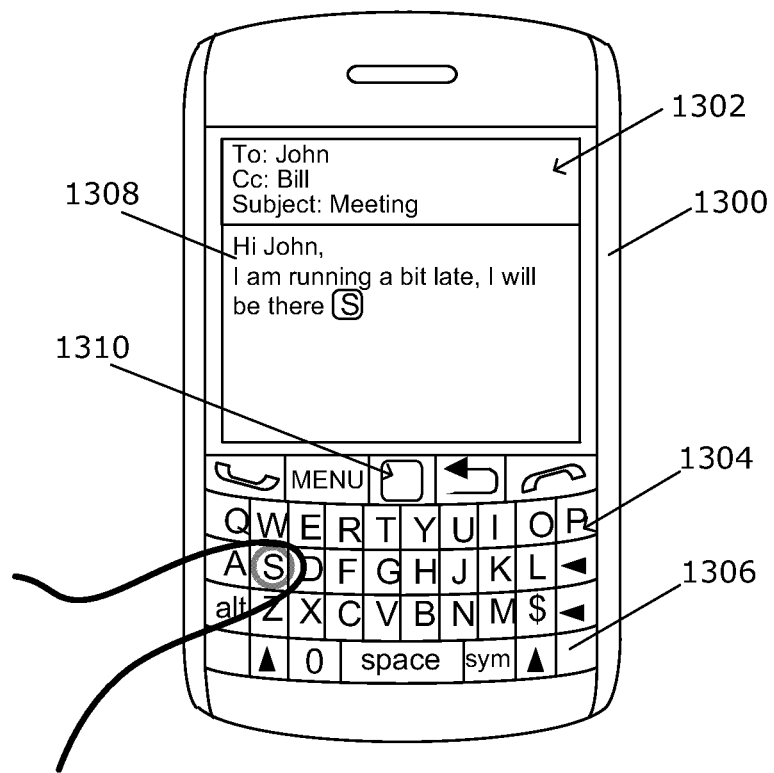
FIGS. 13 to 18 illustrate another example of a portable electronic device receiving touches in accordance with the present disclosure.

A front view of another example of a portable electronic device 100 is shown in FIG. 13. The portable electronic device 100 includes a housing 1300 that houses the internal components that are shown in FIG. 1 and frames a display 1302, such as an LCD, and a keypad 1304. The processor 102 of the portable electronic device 100 is capable of receiving character input when keys of the keypad 1304 are depressed. The keypad 1304 further includes a touch-sensitive surface 1306 capable of detecting touches in a similar manner as the touch-sensitive overlay 114. The portable electronic device 100 may include also include an optical trackpad 1310, as shown.

Reference is again made to FIG. 2, with additional reference to FIGS. 13 to 18 to describe another example of a method of facilitating input at the portable electronic device 100. For the purpose of the present explanation, the user has already entered characters in a text field during composition of an email. In this example, the text field is a body 1308 of an e-mail.

Figure 14:
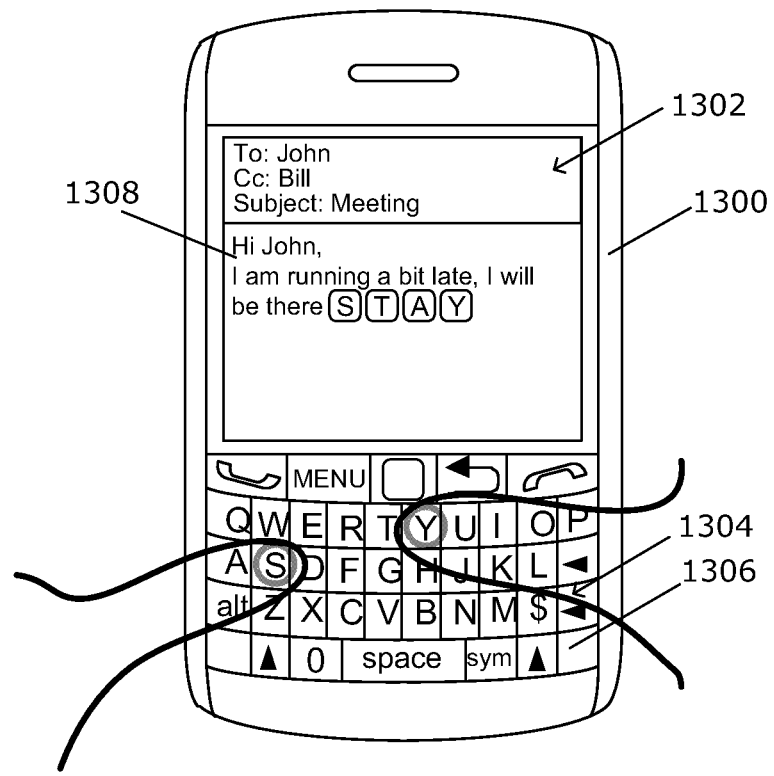

The user touches the touch-sensitive surface 1306 at a location corresponding to the character "s" with a left thumb, as shown in FIG. 13, and touches the touch-sensitive surface 1306 at a location corresponding to the character "y" with a right thumb, as shown in FIG. 14. When the touches have been detected 200, 202, matching candidate objects having an initial character that matches "s" and a final character that matches "y" are identified 204 in reference data. As shown in FIG. 14, "stay", which is determined to be the most probable candidate object, is displayed 206.

Figure 15:
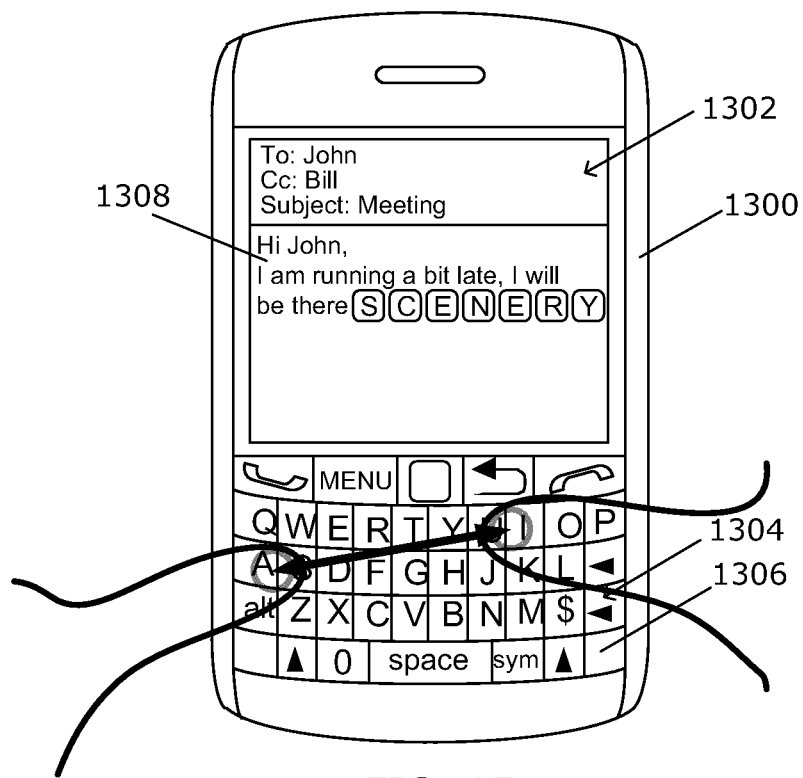
Figure 16:
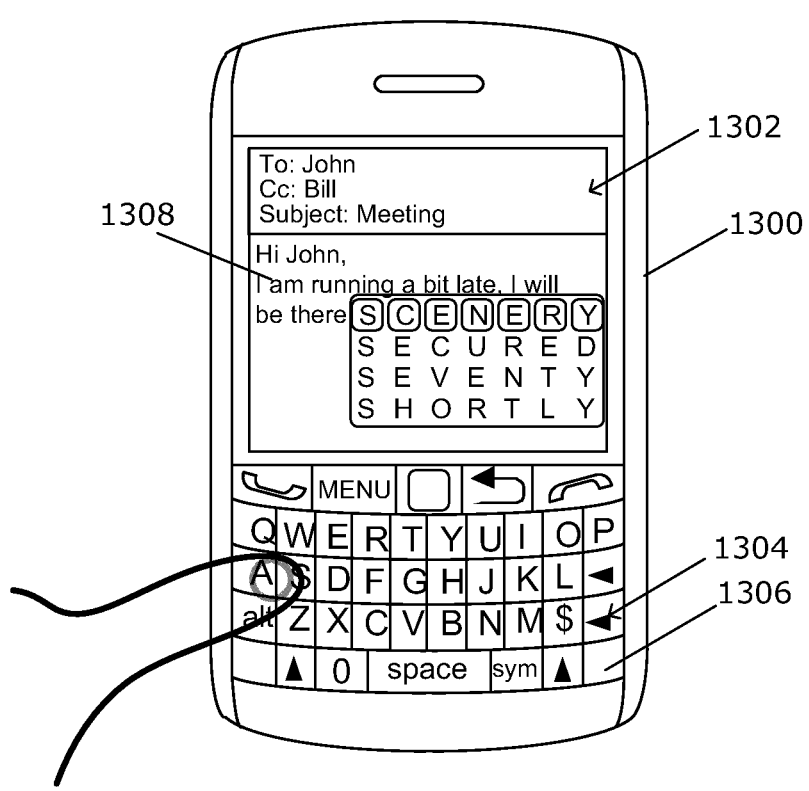
Figure 17:
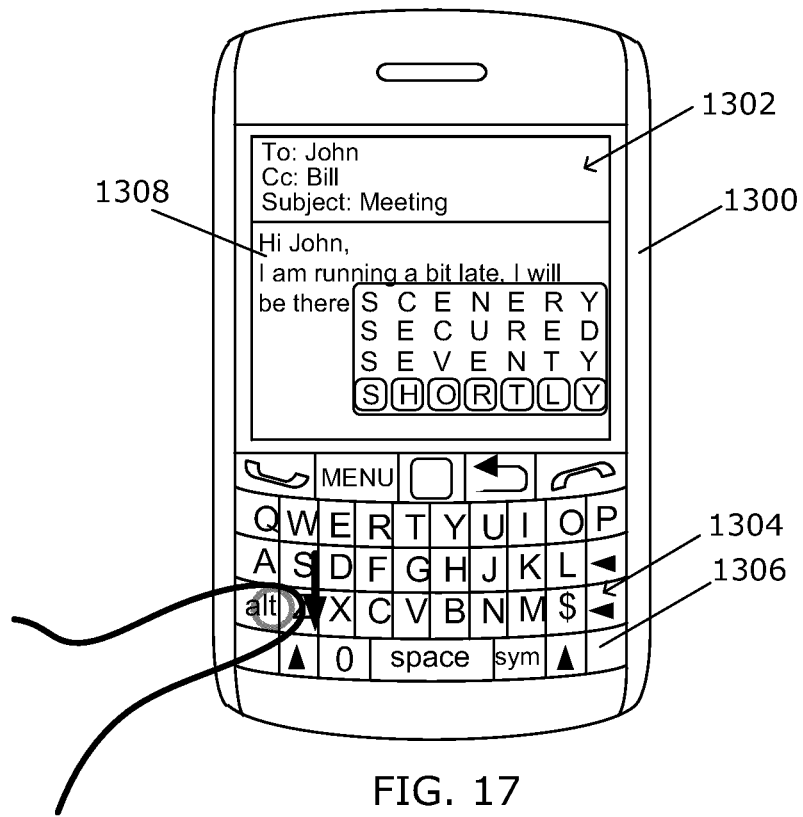

When "stay" is not the object to be entered, the user moves both touch locations away from one another to approximate a length of the word that the user wishes to enter, as shown in FIG. 15. Following detection 208 of the touch movement, a distance between the first touch and the second touch is determined 210. The distance is associated with seven characters and candidate objects having seven characters, an initial character "s" and a final character "y" are identified 212 in reference data. An ordered list of matching candidate objects is then displayed 214, as shown in FIG. 16. The list includes "secured", "seventy" and "shortly". The most probable candidate object, "scenery", is highlighted at the top of the list.

Figure 18:
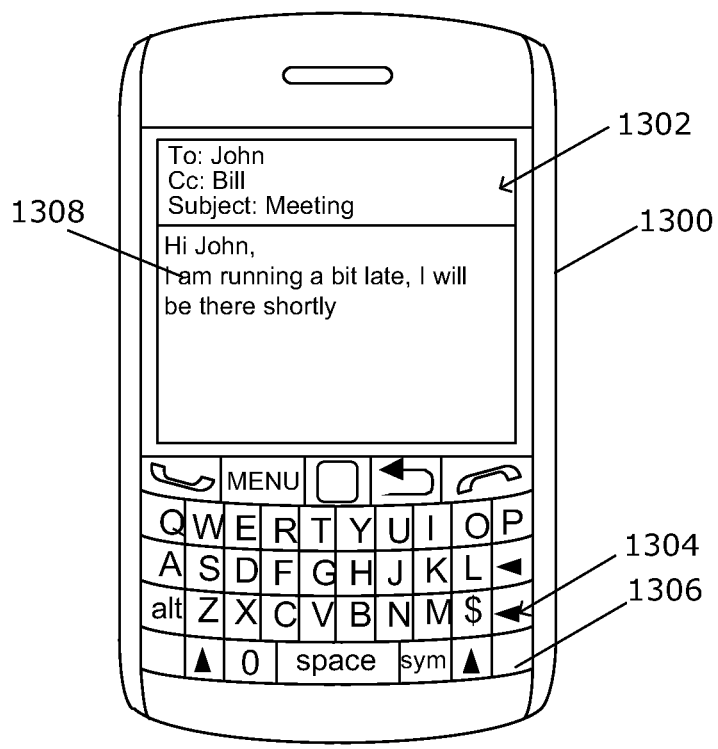

When the object to be entered is not "scenery", which is highlighted, but is a seven letter word, the user ends one of the touches. As shown in FIG. 16, touch contact between the touch-sensitive surface 1306 and the right thumb is discontinued. The user then moves the right thumb up and/or down on the touch-sensitive surface 1306 to scroll through the list of ordered candidate objects. Because the list is ordered based on a criteria, such as frequency of use, the user generally does not need to scroll the entire list, which may be extensive. In the present example, the object to be entered it "shortly", which is highlighted in FIG. 17. The user then ends touch contact between the touch-sensitive surface 1306 and the left thumb to end both touches 216. The highlighted word, "shortly", is then displayed 218 in the text field 1308, as shown in FIG. 18.

Alternatively, the word may be displayed 218 in the text field 1308 when the user presses one or two of the keys of the keyboard 802. In this embodiment, ending both touches may cause the operation to be cancelled in which case, no word is displayed.

Although, in the examples described herein, adjustment of the distance between touch locations is achieved in response to movement of both touches, the distance may instead be adjusted by maintaining one touch location and moving the other touch location. Further, user thumbs are referred to in the examples described herein, however, the method may be achieved using a different user finger or other item, for example.

In the examples described with reference to FIG. 2, the first and second touches are continuous until a distance between the first and second touch locations corresponds to a desired number of characters of an object to be entered. When one touch ends, the list of candidate objects may be scrolled in response to movement of the touch that is maintained. When both touches have ended, the highlighted candidate object is displayed in a text field.

The method of FIG. 2 is operable with a regular text entry mode. In order to differentiate between regular typing and the method of FIG. 2, a timer may be used. For example, simultaneous left and right touches occurring for more than 400 ms may trigger the identification 204 of matching candidate objects in reference data. Alternatively, movement of the touches may indicate that the method of FIG. 2 is being performed.

Rather that the first touch and second touch being associated with the first and last characters of an object, the first touch and the second touch may be associated with the first and second characters of an object. Similar to the previously described examples, the distance between the first touch and the second touch corresponds to a length of the object.

The method of facilitating input at an electronic device is a convenient alternative method for entering data. The method may improve data entry speed and, particularly when entering data on a wide keyboard, may be more comfortable for the user. The method may also be entertaining and educational because many different lists of candidate objects may be displayed for the user. In touch-sensitive display embodiments, the method may reduce the portion of the display that is dedicated to the virtual keyboard therefore increasing the usable display area.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method of facilitating input at an electronic device, the method comprising:
    detecting a first touch at a first touch location on a touch-sensitive device to select a first character of a virtual keyboard;
    detecting a second touch at a second touch location on the touch-sensitive device to select a second character of the virtual keyboard;
    in response to movement of one of the first touch and the second touch being detected, determining a distance between the first touch location and the second touch location, the distance being associated with a number of characters of an object;
    identifying candidate objects in reference data that match the number of characters and include an initial character that matches the first character and a final character that matches the second character; and
    displaying at least one candidate object.

2. A method as claimed in claim 1, comprising ordering the candidate objects that match the number of characters and include an initial character that matches the first character and a final character that matches the second character based on a criterion and displaying a most probable candidate object.

3. A method as claimed in claim 1, wherein when movement of one of the first touch and the second touch is detected, determining an updated distance.

4. A method as claimed in claim 1, comprising displaying a list of ordered candidate objects, the list including a most probable candidate object and the ordered candidate objects being selectable from the list.

5. A method as claimed in claim 4, comprising receiving an input, the input corresponding to one of the candidate objects of the list of ordered candidate objects.

6. A method as claimed in claim 1, comprising displaying a most probable candidate object prior to movement of the first touch being detected, an initial character of the most probable candidate object matching the first character and a final character of the most probable candidate object matching the second character.

7. A method as claimed in claim 1, wherein the touch-sensitive device is a touch-sensitive display.

8. A method as claimed in claim 5, wherein the input is generated in response to both touches ending.

9. A method as claimed in claim 2, wherein the criterion is frequency of use.

10. A method as claimed in claim 1, wherein the distance is associated with a number of characters of an object by determining a ratio of the distance to a screen width.

11. A non-transitory computer-readable medium comprising instructions executable on a processor of an electronic device for implementing the method of claim 1.

12. An electronic device comprising:

a housing;

a display exposed by the housing; and functional components in the housing comprising a memory and a processor operably connected to the display and configured to: detect a first touch at a first touch location on a touch-sensitive surface; the first touch selecting a first character of a virtual keyboard, detect a second touch at a second touch location on the touch-sensitive surface, the second touch selecting a second character of the virtual keyboard, determine a distance between the first touch location and the second touch location in response to movement of one of the first touch and the second touch being detected, the distance being associated with a number of characters of an object, identify candidate objects in reference data that match the number of characters, include an initial character that matches the first character and a final character that matches the second character, and display at least one candidate object.

\* \* \* \* \*